UNITED STATES PATENT OFFICE 2,683,129

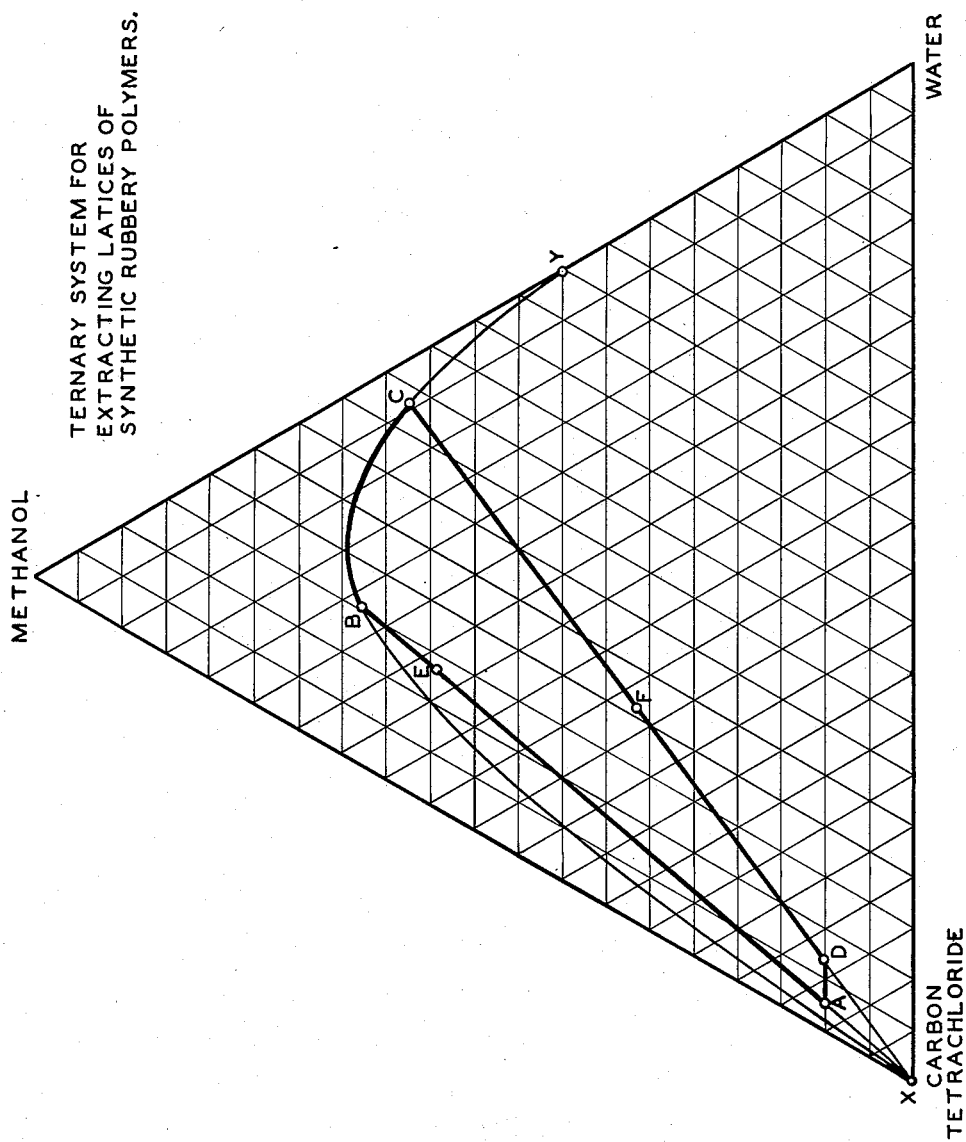

PROCESS FOR PREPARING SOLUTIONS OF SYNTHETIC RUBBERY POLYMERS

Francis H. Bratton, Newark, and Steffen F. Dieckmann, Wilmington, Del., assignors to Hercules Powder Company, Wilmington, Del., a corporation of Delaware Application December 22, 1951, Serial No. 262,914

10 Claims. (Cl. 260—33.8)

1

This invention relates to the formation of solutions of synthetic rubbery polymers, and more particularly to the formation of such solutions by extracting latices of synthetic rubbery polymers with extraction media containing a solvent for said synthetic rubbery polymers.

The products obtained by chlorinating synthetic rubbery polymers are known to have desirable properties as protective coatings in much the same way that chlorinated natural rubber is desirable. Such chlorinated products are most conveniently prepared by chlorinating a solution of synthetic rubbery polymer dissolved in a solvent such as carbon tetrachloride. Heretofore, however, coagulation of the polymer from a latex in which it is formed followed by washing, drying, and dissolving in solvent has been both expensive and time-consuming. Furthermore, various proposed methods for obtaining solutions of synthetic rubbery polymers in suitable solvents directly from the latex have not been fully satisfactory for various technical and/or economic reasons.

Now in accordance with this invention a solution of synthetic rubbery polymer suitable for chlorination and other purposes is prepared by mixing a latex of synthetic rubbery polymer with an extraction medium consisting of carbon tetrachloride and methanol in such proportions that the carbon tetrachloride and methanol in said extraction medium taken with the water present in said latex defines a ternary system within the area ABCD on the appended drawing, allowing the mixture of latex and extraction medium to separate into a light phase and a heavy phase, and recovering the heavy phase comprising a solution of synthetic rubbery polymer in carbon tetrachloride. Within the area ABCD there is a preferred area AEFD on the appended drawing. If desired, a clarifying agent can be added to the system to aid or hasten clarification of the light phase. Preferably such clarifying agent is added to the light phase subsequent to the separation of the mixture into a light phase and a heavy phase, and prior to recovery of the heavy phase.

In a preferred embodiment of the invention a soap-stabilized latex of synthetic rubbery polymer is added slowly with gentle agitation to a suitable mixture of carbon tetrachloride and methanol, agitation is stopped, and the mixture is allowed to stand for a time, during which the mixture separates into a light phase and a heavy phase. At this point it is preferred to add a small quantity of a clarifying agent such as an

2 acid, alkali or salt solution to the light phase and allow the system to again stand for a time. The two liquid layers or phases are separated by any convenient means. The heavy phase is a solution of synthetic rubbery polymer in carbon tetrachloride containing a small amount of methanol and water which is readily removed by distillation. The heavy phase also contains some soap and/or fatty or resin acid which for most purposes is not considered objectionable. Following removal of the small amount of methanol and water, the polymer solution in carbon tetrachloride is then chlorinated by known methods to obtain chlorinated synthetic rubbery polymer.

Preparation of solutions of synthetic rubbery polymers by the method of this invention requires but a fraction of the time required by any other known method. Moreover, the solutions obtained contain only minor amounts of water which are readily and economically removed by distillation.

Although it is not intended that the invention shall be limited to any particular theory of operation, it is presently believed that the methanol in the extraction medium acts as a cosolvent for carbon tetrachloride and water and thus carries carbon tetrachloride into the watery latex. By this means the individual polymer micells are rapidly and uniformly made accessible to the solvent action of carbon tetrachloride. As a result solution is very rapid, very uniform, and there is a minimum occlusion of water and impurities in the solution formed. Heretofore, attempts to extract latices with carbon tetrachloride alone have either resulted in separation of the polymer in the form of a heavy contaminated gel only slightly solvated by the carbon tetrachloride and which is unmanageable, or have required excessively lengthy periods to obtain satisfactory solutions. Both difficulties indicate that the carbon tetrachloride could not rapidly and uniformly reach the individual polymer micells in the latex. It is also believed that the methanol acts to break the latex emulsion, for after mixing the latex with the extraction medium there is a separation into a light and heavy phase upon standing.

Having set forth the general nature of the invention, the following examples illustrate specific embodiments of the invention, but these are not to be construed as a limitation of the invention. All parts and percentages are by weight unless otherwise stated.

*Example 1*

Five thousand four hundred fifty parts carbon tetrachloride and 5980 parts anhydrous methanol were mixed together in a container equipped with a propeller stirrer. While the above mixture was being gently stirred, 2360 parts of a polyisoprene latex was added over a five-minute period. Stirring was stopped and the mixture allowed to stand for one-half hour. During this time the mixture separated into a light phase and a heavy phase. One hundred twenty-two parts of 50% aqueous sodium hydroxide solution was then added to the light phase and the mixture was allowed to stand again for one-half hour, after which the two liquid layers were separated by decantation. The light layer contained 18.1% water, 28.9% carbon tetrachloride, 50.9% methanol, and 2.1% solids consisting largely of fatty acid soaps employed as emulsifying agents in the latex together with sodium hydroxide added as clarifying agent to the light phase.

The heavy layer comprising a solution of polyisoprene in carbon tetrachloride contained 80.2% carbon tetrachloride, 3.5% methanol, 1.2% water, and 15.1% solids consisting largely of polyisoprene. The polyisoprene dissolved in the heavy phase or layer contained on the dry basis 0.19% ash, 0.10 fatty acid (as stearic), and 0.41% soap (as sodium stearate). The viscosity of a 2% solution of the polyisoprene in carbon tetrachloride was 7.4 C. P. S. at 25° C.

The latex employed in this example contained 26.8% polyisoprene having a four-minute Mooney viscosity of 4.5, taken at 212° F. with the ML rotor (A. S. T. M. method D927-47-T), 71% water, 2.0% fatty acid soap, and 0.2% salts. The solution of polyisoprene in carbon tetrachloride was smooth and uniform, and after removal of residual water and methanol by distillation, was chlorinated satsfactorily by known means to produce chlorinated polyisoprene having desirable protective coating properties.

*Example 2*

Substantially the same procedure set forth in Example 1 was followed employing 300 parts polyisoprene latex, 384 parts anhydrous methanol, 816 parts carbon tetrachloride, and 8.4 parts of 50% aqueous sulfuric acid as a clarifying agent instead of the sodium hydroxide solution in Example 1.

The light layer contained 35.1% water, 13.6% carbon tetrachloride, 50.3% methanol, and 1% solids consisting largely of fatty acid derived from the emulsifying agent in the latex.

The heavy layer comprising a solution of polyisoprene in carbon tetrachloride contained 84.6% carbon tetrachloride, 1.2% methanol, 0.6% water, and 13.6% solids consisting largely of polyisoprene. The polyisoprene dissolved in the heavy layer contained on the dry basis 0.37% ash and 5.18% fatty acid (as stearic acid).

The latex employed in this example contained 26.4% polyisoprene having a four-minute Mooney viscosity of 9 determined as set forth in Example 1, 71% water, 1.7% fatty acid soap, and 1.2% salts.

The solution of polyisoprene in carbon tetrachloride was smooth and uniform, and after removal of residual water and methanol by distillation, was chlorinated satisfactorily by known means to produce chlorinated polyisoprene having desirable protective coating properties.

In general, the invention can be employed to advantage for the transfer, from the aqueous latices in which they were polymerized, to carbon tetrachloride, of any synthetic rubbery polymers or copolymers produced chiefly from polymerizable conjugated unsaturated compounds such as butadiene-1,3, isoprene (2-methyl butadiene-1,3), 2,3-dimethyl butadiene-1,3, piperylene, 2-chlorobutadiene-1,3, 2-acetoxy butadiene-1,3 and the like. It is to be understood that the polymer or copolymer need not be derived from a single unsaturated compound, but can be derived from a mixture of two or more conjugated unsaturated compounds of the type set forth above. Likewise suitable are copolymers of one or more of the conjugated unsaturated compounds with one or more single unsaturated compounds copolymerizable therewith, examples of such compounds being vinyl aromatic compounds, such as styrene, chlorostyrene, vinyl naphthalene, and the like; acrylic compounds, such as acrylonitrile, methacrylonitrile, ethyl acrylate, methyl methacrylate, and the like; vinyl compounds, such as vinyl acetate, vinyl ethyl ether, vinyl ethyl sulfide, vinyl methyl ketone, vinyl chloride, and the like; vinylidene compounds; monolefins, such as isobutene, ethylene, and the like. For chlorination purposes it is preferred that the polymers in accordance with this invention will be prepared from monomeric mixtures containing at least about 50% by weight of conjugated unsaturated monomers.

Synthetic rubbery polymers and copolymers embracing various mixtures of the above and like compounds are readily prepared by known polymerization techniques or recipes of which many are known and utilized in the art. For chlorination purposes polymerization should be arrested at a point where the polymer formed will have a four-minute Mooney viscosity of not more than about 11 determined in accordance with A. S. T. M. method D927-47-T measured at 212° F. with the ML rotor. For other purposes, such as utilization in cements or adhesives, polymers having higher Mooney viscosities are permissible and often desirable. In any case, the polymerization will be arrested before the polymer becomes insoluble in carbon tetrachloride. The amount of polymers dispersed in the latices of this invention will normally be within the range between about 25% and about 30% by weight, since this level of concentration is an optimum arrived at in developing successful emulsion polymerization recipes. Such latices can be diluted if desired but such practice is usually not economical.

For chlorination purposes it is preferred to employ fresh uninhibited or unstabilized latices, for the amine or phenol stabilizing agents normally employed in preserving latices of synthetic rubbery polymers interfere with chlorination. However, it has been found that an amine stablizer, if present, is largely converted to a water-soluble salt which is extracted in the water phase by employing an acid clarifying agent in the process of this invention. Similarly, if a phenolic stabilizer is present in the latex, it is largely converted to a water-soluble salt which is extracted in the water phase by employing aqueous caustic clarifying agent.

The extraction media consist of mixtures of carbon tetrachloride and methanol. The important criterion in accordance with this invention is that the amounts by weight of carbon tetrachloride and methanol in the extraction media taken with the amount of water by weight present in the latex must define a ternary system within the area ABCD on the attached drawing. Preferably, the amounts of carbon tetrachloride and methanol taken with the water in the latex should define a ternary system within the area AEFD on the attached drawing.

With reference to the attached drawing, all ternary compositions of carbon tetrachloride, methanol and water, derived by mixing latices with mixtures of carbon tetrachloride and methanol, falling in the area above the curve XBCY are homogeneous, one-phase liquid systems which do not separate into a light phase and a heavy phase. Hence, such compositions are wholly inoperable for the purposes of this invention. Ternary compositions of carbon tetrachloride, methanol and water, derived by mixing latices with mixtures of carbon tetrachloride and methanol, falling below the line XDFCY on the drawing, although they separate into a light phase and a heavy phase upon mixing latex with carbon tetrachloride-methanol mixtures, are incapable of producing a usable solution of synthetic rubbery polymer in carbon tetrachloride and hence are wholly inoperable in accordance with this invention. Within this area the synthetic rubbery polymer separates as a solid phase, usually in the form of a badly contaminated gel mass which is unmanageable. Ternary compositions of carbon tetrachloride, methanol and water, derived by mixing latices with mixtures of carbon tetrachloride and methanol, falling within the area between XB and XAEB on the drawing separate into a light phase and a heavy phase, and the heavy phase comprises a solution of synthetic rubbery polymer in carbon tetrachloride. However, such ternary systems defined by this area are impractical for the purposes of this invention because of excessively large amounts of carbon tetrachloride in the light phase, and large amounts of methanol and water in the heavy phase.

A very important relationship exists between the ratio of methanol in the extraction medium and water in the latex for operability in accordance with this invention. Within the area ABCD on the drawing the ratio of methanol in the extraction medium to water in the latex is between about 4:1 and 1.5:1 by weight. For optimum results this ratio should lie between about 3.6:1 and about 1.8:1 by weight.

The amount of carbon tetrachloride required in the extraction medium will depend both upon the degree of polymerization of the synthetic rubbery polymer and also upon the viscosity of the solution of polymer in carbon tetrachloride desired. It will be apparent that for any given viscosity desired in the final solution the amount of carbon tetrachloride required will increase with increasing degree of polymerization in the polymer, and conversely, the amount of carbon tetrachloride required will decrease with decreasing degree of polymerization in the polymer. With polymers having Mooney viscosities in the order of 2 to 11, it is desirable for chlorination purposes to select a ratio of carbon tetrachloride to polymer of about 9:1 by weight. With the above range of Mooney viscosities, this ratio produces eminently satisfactory solutions of polymer in carbon tetrachloride with respect to viscosity requirements. Obviously, of course, polymers having very low Mooney viscosities below about 2 will require a lower carbon tetrachloride-to-polymer ratio, whereas polymers of Mooney viscosities above 11 will require higher ratios of carbon tetrachloride to polymer to obtain a desired suitable viscosity.

Preferably the latex should be added to the extraction medium with gentle agitation, for this favors rapid separation of the light and heavy phases after mixing and allowing to stand. The mixing operation can be carried out satisfactorily at room temperatures or at elevated temperatures up to about 50° C. Slightly elevated temperatures favor a lower viscosity in the heavy phase comprising a solution of the polymer in carbon tetrachloride and hence facilitates operations.

Following mixing, the system is allowed to stand quietly without agitation to permit separation into a light phase and a heavy phase. Normally this takes place within a half hour or less, but in some instances more time is required. If desired, the heavy phase can be recovered without recourse to the use of any auxiliary clarifying agent. However, it is desirable to employ a small amount of a well-known clarifying agent such as acid, caustic alkali or salt to hasten clarification of the light phase. The clarifying agent can be added before or during the mixing step if desired, or at a point in the process subsequent to mixing but prior to recovery of the heavy phase. Usually it is preferred to permit the system to separate into a light phase and a heavy phase and then add the clarifying agent to the light phase and permit the system to stand for several minutes. During this period the light phase becomes substantially clear, or at most retains a slight haze.

The clarifying agents of this invention are the usual well-known electrolytic coagulating agents generally employed for breaking latex emulsions. The amount employed is conveniently expressed as a ratio of clarifying agent to water in the latex by weight. For optimum results the ratio of a caustic alkali such as sodium hydroxide to water in the latex is about 0.075. For an acid such as sulfuric or hydrochloric acid this ratio is in the order of 0.02 for optimum results. For a salt such as sodium chloride this ratio is in the order of 0.05 to 0.075. More can be employed if desired but is wasteful of reagent without accomplishing any appreciable additional beneficial result in clarification. Lesser amounts can be employed if desired with some decrease in efficiency of clarification.

It is of interest to point out that when a caustic alkali clarifying agent such as sodium hydroxide is employed, a relatively pure polymer very low in contaminating fatty or resin acids and soaps thereof is extracted from the latex. For certain purposes such a polymer is to be preferred over one containing higher amounts of fatty or resin acids and soaps thereof.

Following separation of the mixture into a light phase and a heavy phase, with clarification if desired, the heavy phase comprising a solution of synthetic rubbery polymer in carbon tetrachloride is recovered by any convenient means, such as by siphoning off the light layer or decanting the light layer or by drawing off the heavy layer from a separatory funnel or the like. The heavy layer usually contains a small amount of water and methanol which for chlorination purposes is removed from the solution of synthetic rubbery polymer. Simple distillation is ordinarily the most practical means for accomplishing this removal. The solution of synthetic rubbery polymer in carbon tetrachloride can then be satisfactorily chlorinated by any of the well-known and conventional chlorination methods to produce chlorinated synthetic rubbery polymer.

This invention provides a rapid and practical method for obtaining smooth and uniform solutions of synthetic rubbery polymers in carbon tetrachloride. Such solutions are eminently suitable for the preparation of chlorinated synthetic rubbery polymers by chlorination methods, and for use in adhesives and cements.

What we claim and desire to protect by Letters Patent is:

1. The process for preparing a solution of synthetic rubbery polymer comprising mixing a latex of synthetic rubbery polymer of the group consisting of homopolymers of a conjugated diolefin, copolymers of a mixture of conjugated diolefins, and copolymers of a mixture of a conjugated diolefin and a copolymerizable compound having a single ethylenic linkage in the molecule with an extraction medium consisting of carbon tetrachloride and methanol, said carbon tetrachloride and methanol, together with the water in said latex defining a ternary system within the area ABCD on the appended drawing, allowing the mixture of latex and extraction medium to separate into a light phase and a heavy phase, and recovering the heavy phase comprising a solution of synthetic rubbery polymer in carbon tetrachloride.

2. The process of preparing a solution of synthetic rubbery polymer comprising mixing a latex of a synthetic rubbery polymer of the group consisting of homopolymers of a conjugated diolefin, copolymers of a mixture of conjugated diolefins, and copolymers of a mixture of a conjugated diolefin and a copolymerizable compound having a single ethylenic linkage in the molecule with an extraction medium consisting of carbon tetrachloride and methanol, said carbon tetrachloride and methanol, together with the water in said latex defining a ternary system within the area AEFD on the appended drawing, allowing the mixture of latex and extraction medium to separate into a light phase and a heavy phase, and recovering the heavy phase comprising a solution of synthetic rubbery polymer in carbon tetrachloride.

3. The process for preparing a solution of synthetic rubbery polymer comprising mixing a latex of a synthetic rubbery polymer of the group consisting of homopolymers of a conjugated diolefin, copolymers of a mixture of conjugated diolefins, and copolymers of a mixture of a conjugated diolefin and a copolymerizable compound having a single ethylenic linkage in the molecule, said synthetic rubbery polymer having a Mooney viscosity not more than about 11, with an extraction medium consisting of carbon tetrachloride and methanol, said carbon tetrachloride and methanol, together with the water in said latex defining a ternary system within the area ABCD on the appended drawing, allowing the mixture of latex and extraction medium to separate into a light phase and a heavy phase, and recovering the heavy phase comprising a solution of synthetic rubbery polymer in carbon tetrachloride.

4. The process for preparing a solution of synthetic rubbery polymer comprising mixing a latex of polyisoprene with an extraction medium consisting of carbon tetrachloride and methanol, said carbon tetrachloride and methanol, together with the water in said latex defining a ternary system within the area ABCD on the appended drawing, allowing the mixture of latex and extraction medium to separate into a light phase and a heavy phase, and recovering the heavy phase comprising a solution of polyisoprene in carbon tetrachloride.

5. The process of preparing a solution of synthetic rubbery polymer comprising mixing a latex of polyisoprene having a Mooney viscosity not more than about 11 with an extraction medium consisting of carbon tetrachloride and methanol, said carbon tetrachloride and methanol, together with the water in said latex defining a ternary system within the area ABCD on the appended drawing, allowing the mixture of latex and extraction medium to separate into a light phase and a heavy phase, and recovering the heavy phase comprising a solution of polyisoprene in carbon tetrachloride.

6. The process for preparing a solution of synthetic rubbery polymer comprising mixing a latex of polyisoprene having a Mooney viscosity not more than 11 with an extraction medium consisting of carbon tetrachloride and methanol, said carbon tetrachloride and methanol, together with the water in said latex defining a ternary system within the area AEFD on the appended drawing, allowing the mixture of latex and extraction medium to separate into a light phase and a heavy phase, and recovering the heavy phase comprising a solution of polyisoprene in carbon tetrachloride.

7. The process for preparing a solution of synthetic rubbery polymer comprising mixing a latex of synthetic rubbery polymer of the group consisting of homopolymers of a conjugated diolefin, copolymers of a mixture of conjugated diolefins, and copolymers of a mixture of a conjugated diolefin and a copolymerizable compound having a single ethylenic linkage in the molecule with an extraction medium consisting of carbon tetrachloride and methanol, said carbon tetrachloride and methanol, together with the water in said latex defining a ternary system within the area ABCD on the appended drawing, allowing the mixture of latex and extraction medium to separate into a light phase and a heavy phase, clarifying the light phase, and recovering the heavy phase comprising a solution of synthetic rubbery polymer in carbon tetrachloride.

8. The process for preparing a solution of synthetic rubbery polymer comprising mixing a latex of polyisoprene having a Mooney viscosity not more than about 11 with an extraction medium consisting of carbon tetrachloride and methanol, said carbon tetrachloride and methanol, together with the water in said latex defining a ternary system within the area ABCD on the appended drawing, allowing the mixture of latex and extraction medium to separate into a light phase and a heavy phase, clarifying the light phase, and recovering the heavy phase comprising a solution of polyisoprene in carbon tetrachloride.

9. The process for preparing a solution of synthetic rubbery polymer comprising mixing a latex of polyisoprene having a Mooney viscosity not more than about 11 with an extraction medium consisting of carbon tetrachloride and methanol, said carbon tetrachloride and methanol, together with the water in said latex defining a ternary system within the area AEFD on the appended drawing, allowing the mixture of latex and extraction medium to separate into a light phase and a heavy phase, clarifying the light phase, and recovering the heavy phase comprising a solution of polyisoprene in carbon tetrachloride.

10. The process for preparing a solution of synthetic rubbery polymer suitable for chlorination comprising mixing a latex of polyisoprene having a Mooney viscosity not more than about 11 with an extraction medium consisting of carbon tetrachloride and methanol, said carbon tetrachloride and methanol, together with the water in said latex defining a ternary system within the area AEFD on the appended drawing, allowing the mixture of latex and extraction medium to separate into a light phase and a heavy phase, clarifying the light phase, recovering the heavy phase comprising a solution of polyisoprene in carbon tetrachloride, and removing residual water and methanol from the heavy phase.

References Cited in the file of this patent

UNITED STATES PATENTS

| Number | Name | Date |
|---|---|---|
| 2,163,612 | McDonald | June 27, 1939 |
| 2,391,281 | Thompson | Dec. 18, 1945 |
| 2,495,135 | Rodman | Jan. 17, 1950 |